United States Patent
Sato et al.

(10) Patent No.: US 7,776,242 B2
(45) Date of Patent: Aug. 17, 2010

(54) METHOD FOR GRANULATING FLEXIBLE POLYOLEFIN RESIN AND GRANULE

(75) Inventors: Yoshinori Sato, Ichihara (JP); Shoichi Yuzaki, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 147 days.

(21) Appl. No.: 11/908,413

(22) PCT Filed: Apr. 4, 2006

(86) PCT No.: PCT/JP2006/307116
§ 371 (c)(1),
(2), (4) Date: Sep. 12, 2007

(87) PCT Pub. No.: WO2006/117963
PCT Pub. Date: Nov. 9, 2006

(65) Prior Publication Data
US 2009/0057935 A1 Mar. 5, 2009

(30) Foreign Application Priority Data
Apr. 26, 2005 (JP) .............................. 2005-127479
Dec. 8, 2005 (JP) .............................. 2005-354898

(51) Int. Cl.
*B29B 9/10* (2006.01)
(52) U.S. Cl. ................................ 264/14; 264/5; 264/13

(58) Field of Classification Search .................... 264/5, 264/13, 14
See application file for complete search history.

(56) References Cited

U.S. PATENT DOCUMENTS

| 5,001,205 A | * | 3/1991 | Hoel | 526/128 |
| 5,041,251 A | * | 8/1991 | McCoskey et al. | 264/130 |
| 2006/0281859 A1 | * | 12/2006 | Suzuki et al. | 524/836 |

FOREIGN PATENT DOCUMENTS

| JP | 5 508116 | 11/1993 |
| JP | 7 88839 | 4/1995 |
| JP | 2002 166417 | 6/2002 |
| JP | 2002 371162 | 12/2002 |
| JP | 2005 15558 | 1/2005 |
| JP | 2005 179556 | 7/2005 |
| WO | 02 079321 | 10/2002 |

* cited by examiner

*Primary Examiner*—Khanh Nguyen
*Assistant Examiner*—Saeed M Huda
(74) *Attorney, Agent, or Firm*—Oblon, Spivak, McClelland, Maier & Neustadt, L.L.P.

(57) ABSTRACT

A method for granulating a flexible polyolefin resin including: melting a flexible polyolefin resin by volatilization after polymerization; cooling the resin to a temperature in a range of the melting point of the resin (Tm-D) ±50° C.; and granulating the cooled resin by an underwater granulation method; the underwater granulation method using cooling water of 30° C. or less in which an antifusion agent is added.

7 Claims, 2 Drawing Sheets

METHOD FOR GRANULATING FLEXIBLE POLYOLEFIN RESIN AND GRANULE

TECHNICAL FIELD

The invention relates to a method for granulating a flexible polyolefin resin. In particular, the invention relates to a method for granulating a flexible polyolefin resin which can reduce tackiness of the flexible polyolefin resin and prevent blocking of the granules. Furthermore, the invention relates to a method for granulating a flexible polyolefin resin which can prevent refusion of the granules after granulating.

BACKGROUND

Flexible polyolefin resins are widely used as raw materials for films and the like as a substitute for a flexible vinyl chloride resin with a large environmental load.

Since a flexible polyolefin resin contains a large amount of low molecular weight components by its nature, the surface of granules made of the resin may exhibit tackiness. Therefore, when a polymerized flexible polyolefin resin is granulated into granules with a size easy to handle, there has been a problem that granules tend to adhere among themselves and form lumps (blocks). Furthermore, refusion of granules is easily conducted after granulation.

As the method for granulating a flexible polyolefin resin, for example, a method of extruding a resin from an extrusion die with a plurality of outlets facing downward toward a cooling water pool, cutting the extruded resin into pellets by means of a rotating cutter under the outlets, and spraying cooling water containing a releasing agent from below has been disclosed (see Patent document 1, for example).

However, this method requires use of a specific resin composition and application of a releasing agent to the surface of the granules. In addition, since pellets float on water surface in cooling process after granulation, a cooling efficiency is impaired.

The inventors of the present invention have found that a tacky feeling of granules of a flexible polyolefin resin can be reduced by melting the resin, and granulating the resin after stirring and kneading the molten resin while cooling the molten resin to a temperature below the melting point. The inventors then filed a patent application directing to the above finding (Patent document 2).

Patent Document 1: JP-A-H7-88839
Patent Document 2: JP-A-2005-179556

However, the method of Patent document 2 cools the polymerized resins and thereafter heats the resins again for melting, which results in low productivity. The method is thus desired to be further improved. In addition, the method of Patent document 2 requires expensive facilities such as a kneader to stir and knead a molten resin while cooling the molten resin after melting the resin. Furthermore, since pellets float in a cooling water pool in some granulation methods, the cooling efficiency of the method of Patent document 2 is impaired. Therefore, further improvement has been demanded for higher granule productivity.

In view of the above problems, an object of the invention is to provide a method for efficiently granulating a flexible polyolefin resin.

An object of the invention is to provide an efficient granulating method without refusion of granules after granulation.

SUMMARY OF THE INVENTION

As a result of extensive studies to solve the subjects, the inventors have found that the tackiness of a flexible polyolefin resin granules can be reduced by cooling a molten flexible polyolefin resin after polymerization and volatilization to a certain temperature, and then granulating the resin by an underwater granulation method. The inventors have found that a cooling efficiency can be improved since the resin can also be cooled when transporting it to a post-granulating process (dewatering process).

In addition, the inventors have found that refusion of granules can be prevented by subjecting the flexible polyolefin resin obtained by the granulation process to a residence treatment at a specific temperature range for a specific time. These findings have led to the completion of the invention.

According to the invention, the following methods for granulating a flexible polyolefin resin and granules are provided.

1. A method for granulating a flexible polyolefin resin comprising:
   melting a flexible polyolefin resin by volatilization after polymerization;
   cooling the resin to a temperature in a range of the melting point of the resin (Tm-D) ±50° C.; and
   granulating the cooled resin by an underwater granulation method;
   the underwater granulation method using cooling water of 30° C. or less in which an antifusion agent is added.

2. The method according to 1 wherein the flexible polyolefin resin is obtained by polymerizing an α-olefin with 3 to 20 carbon atoms using a metallocene catalyst.

3. The method according to 1 to 2 wherein the flexible polyolefin resin is polypropylene having the following properties of (1) to (3):
   (1) the polypropylene has a melting point (Tm-D) of 20 to 120° C.,
   (2) the crystallization time of the polypropylene is 3 minutes or more, and
   (3) PP isotacticity [mm] is 50 to 90 mol %.

4. The method according to 1 or 2 wherein the flexible polyolefin resin is a 1-butene polymer having the following property of (4):
   (4) PB isotacticity ((mmmm)/(mmrr+rmmr)) is 20 or less.

5. The method according to any one of 1 to 4 further comprising:
   subjecting the flexible polyolefin resin to a residence treatment at 50° C. or less for 5 minutes or more and 24 hours or less after the granulating.

6. The method according to 5 wherein the residence treatment is performed by using a water pool.

7. Granules of a flexible polyolefin resin granulated by the method of any one of 1 to 6.

Since the method for granulating a flexible polyolefin resin of the invention utilizes heat of a volatilization process and involves an underwater granulation method excelling in cooling efficiency, the method has high productivity. The method of the invention has a high cooling efficiency at granulation, leading to downsizing of facilities.

Furthermore, the method of the invention enhances utility value of a product due to no refusion of granules after granulating.

BEST MODE FOR CARRYING OUT THE INVENTION

The granulation method of the invention will now be described.

Figure 1:
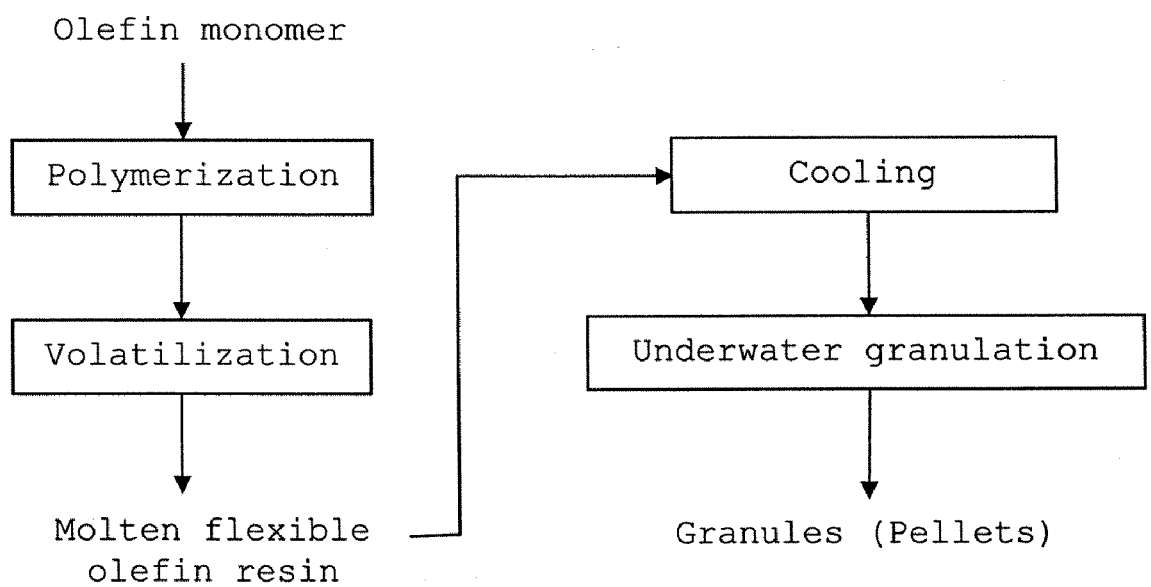
FIG. 1 is a flow chart for illustrating the granulation method of the invention.

FIG. 1 is a flow chart for illustrating the granulating method of the invention.

An olefin monomer, which is a raw material, undergoes a known polymerization such as solution polymerization and vapor phase polymerization to be a flexible polyolefin resin. The flexible polyolefin resin obtained is heated and volatilized to remove a solvent, an unreacted monomer component and the like therefrom. Since the temperature of the volatilization process is usually about 100° C. to about 250° C., the resin is in a molten state. In the invention, the molten resin is directly transported to a cooling process. This eliminates the need of reheating processes of the resin, whereby productivity can be improved.

The volatilization process can be carried out with usual apparatuses such as a melting vessel. The molten resin can be transported through pipe lines with transporting means such as a gear pump.

In the invention, the molten flexible polyolefin resin is cooled to a temperature in a range of the melting point of the resin (Tm-D) ±50° C., preferably (Tm-D) ±20° C., followed by granulating. This reduces the tacky feeling of the resin at granulation. Therefore, it can be suppressed that pellets adhere among themselves and form lumps at granulation.

In the present specification, the melting point of the resin (Tm-D) is defined as the peaktop of the peak observed on the highest temperature side of a fusion endothermic curve obtained by heating 10 mg of a sample at a rate of 10° C./min after being retained at 10° C. for 5 minutes in a nitrogen atmosphere measured by using a differential scanning calorimeter (DSC).

As the apparatuses for cooling the resin, a polymer cooler, kneader equipped with a jacket, polymer mixer equipped with a jacket and the like can be used. The polymer cooler is preferably used since the box is relatively low cost and can reduce the equipment cost.

An underwater granulation is conducted after cooling the resin. The underwater granulation method will now be described with reference to a drawing.

Figure 2:
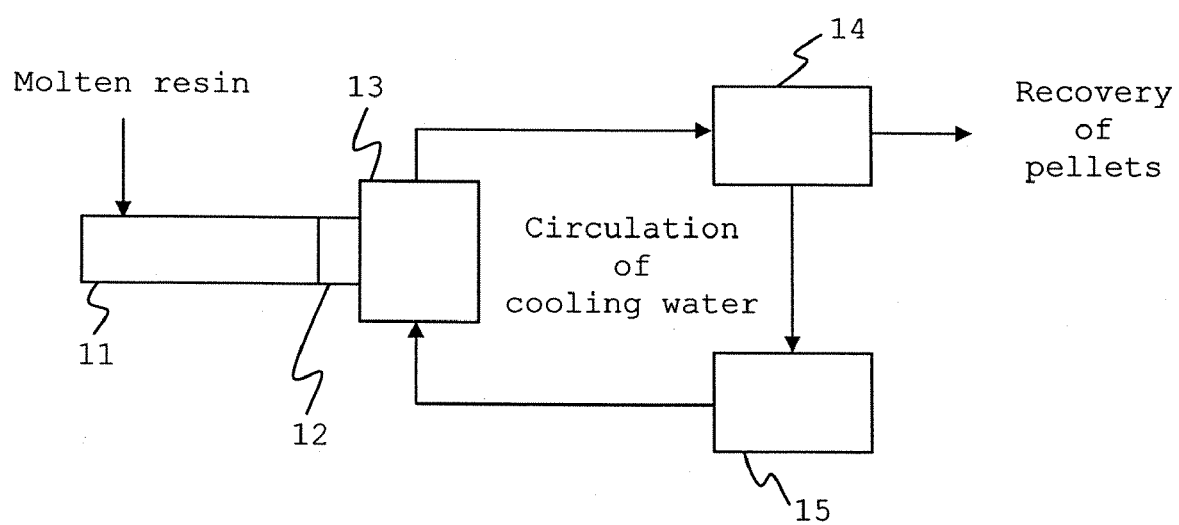
FIG. 2 is a schematic drawing for illustrating an underwater granulation method.

FIG. 2 is a schematic drawing for illustrating an underwater granulation method.

In the underwater granulation method, a resin cooled with a cooler 11 passes through a dice 12 with at least one hole having a specific shape provided at an end of the cooler 11, and is then cut into a pellet shape with a cutting chamber 13.

The cutting chamber 13 cuts a resin with a cutting edge which spins at a high speed. The cooling water in the chamber 13 circulates in the chamber 13, a dewaterer 14 and a cooling water tank 15. The cut pellets are transported to the dewaterer 14 from the chamber 13 with the circulating water. Subsequently, the pellet resin and the cooling water are separated with the dewaterer 14, and then the pellets are recovered.

Unlike a cooling water pool, the underwater granulation method can efficiently cool the cut resin pellets with a water stream without floating of pellets on a water surface, whereby cooling facilities can be downsized.

In the invention, the temperature of the cooling water of the underwater granulation method is set at 30° C. or less. The temperature of the cooling water is preferably 20° C. or less, more preferably 15° C. or less. When the temperature of the cooling water is more than 30° C., the pellets may adhere among themselves and form lumps due to insufficient cooling of the resin at granulation.

The temperature of the cooling water can be adjusted with a heat media cooler or a heat media heater (not shown).

In the invention, an antifusion agent is added into the cooling water. As the antifusion agent, silicone and the like can be used.

The amount of the antifusion agent added may be appropriately adjusted depending on the type of the antifusion agent used. For example, in the case where silicone is used as the antifusion agent, the amount of the antifusion agent added in the cooling water is 100 wtppm to 5000 wtppm, preferably 500 wtppm to 1000 wtppm.

The rotation speed of the cutting edge of the cutting chamber is generally 1 to 20 m/s, preferably 1 to 10 m/s.

Although the granulation method of the invention can be applied to a common flexible polyolefin resin without any specific limitations, a polymer obtained by polymerizing an α-olefin with 3 to 20 carbon atoms using a metallocene catalyst is particularly preferable. This is because the polymer obtained by polymerization using a metallocene catalyst has a uniform molecular weight and composition distribution to contain only a very small amount of components that induce crystal nuclei, and has flowability even when the polymer is cooled with a cooler.

As examples of the α-olefin with 3 to 20 carbon atoms, propylene, 1-butene, 1-hexene, 1-octene, 1-decene, 1-dodecene, 1-tetradecene, 1-hexadecene, 1-octadecene, 1-eicosene, and the like can be given. The flexible polyolefin resin may be either a homopolymer of these α-olefins or a copolymer of these α-olefins. The copolymer may contain ethylene in addition to the above α-olefins. Preferable polymers are propylene-based polymers and 1-butene-based polymers.

The metallocene-type flexible polyolefin resin can be produced by polymerizing the above-mentioned α-olefins in the presence of a metallocene catalyst consisting of a transition metal compound of the group 4 of the periodic table containing cyclopentadienyl rings and methylaluminoxane, or a compound forming an ion complex by the reaction with the transition metal compound of the group 4 of the periodic table and an organoaluminum compound.

As examples of the main catalyst component of the transition metal compound of the group 4 of the periodic table containing cyclopentadienyl rings, a compound of zirconium, titanium, or hafnium containing a multidentate coordination compound as a ligand, in which at least two groups selected from the group consisting of cycloalkadienyl groups or substituted derivatives thereof, specifically, an indenyl group, substituted indenyl groups, and its partial hydrides are bonded with each other via a lower alkylene group or silylene group, can be given.

Specifically, such transition metal compounds include stereorigid chiral compounds of zirconium and hafnium such as ethylene-bis-(indenyl)zirconium dichloride reported by H. H. Brintzinger et al in J. Organometal. Chem., 288, 63 (1985), ethylene-bis-(indenyl)hafnium dichloride described in J. Am. Chem. Soc., 109, 6544 (1987), dimethylsilylbis(2,4-dimethylcyclopentadienyl)zirconium dichloride, dimethylsilylbis(2,4,5-trimethylcyclopentadienyl)zirconium dichloride, or hafnium dichloride of these complexes reported by H. Yamazaki et al, in Chemistry Letters, 1853 (1989).

The following compounds can be given as specific examples: ethylenebis(indenyl)zirconium dichloride, ethylenebis(4,5,6,7-tetrahydro-1-indenyl)zirconium dichloride, ethylenebis(4-methyl-1-indenyl)zirconium dichloride, ethylenebis(5-methyl-1-indenyl)zirconium dichloride, ethylenebis(6-methyl-1-indenyl)zirconium dichloride, ethylenebis(7-methyl-1-indenyl)zirconium dichloride, ethylenebis(2,3-dimethyl-1-indenyl)zirconium dichloride, ethylenebis(4,7-dimethyl-1-indenyl)zirconium dichloride, ethylenebis(indenyl)hafnium dichloride, ethylenebis(4,5,6,7-tetrahydro-1-indenyl)hafnium dichloride, ethylenebis(4-methyl-1-indenyl)hafnium dichloride, ethylenebis(5-methyl-1-indenyl)hafnium dichloride, ethylenebis(6-methyl-1-indenyl)hafnium dichloride, ethylenebis(7-methyl-1-indenyl)hafnium dichloride, ethylenebis(2,3-dimethyl-1-indenyl)hafnium dichloride, ethylenebis(4,7-dimethyl-1-indenyl)hafnium dichloride, dimethylsilylenebis(indenyl)zirconium dichloride, dimethylsilylenebis(indenyl)hafnium dichloride, dimethylsilylenebis(4-methylindenyl)zirconium dichloride, dimethylsilylenebis(indenyl)hafnium dichloride, dimethylsilylenebis(2,4,5-trimethylcyclopentadienyl) zirconium dichloride, dimethylsilylenebis(2,4,5-trimethylcyclopentadienyl)hafnium dichloride, dimethylsilylenebis(2,4-dimethylcyclopentadienyl)zirconium dichloride, dimethylsilylenebis(2,4-dimethylcyclopentadienyl)hafnium dichloride, dimethylsilylenebis(3-methylcyclopentadienyl)zirconium dichloride, dimethylsilylenebis(3-methylcyclopentadienyl)hafnium dichloride, dimethylsilylenebis(2-methyl-4-phenylindenyl)zirconium dichloride, and dimethylsilylenebis(benzoindenyl)zirconium dichloride.

Furthermore, (dimethylsilylene)(dimethylsilylene)-bis(indenyl)zirconium dichloride, (ethylene)(ethylene)bis(indenyl)zirconium dichloride, (ethylene)(ethylene)bis(3-methylindenyl)zirconium dichloride, and (ethylene)(ethylene)bis(4,7-dimethylindenyl)zirconium dichloride and the like, as well as compounds with the zirconium in these compounds substituted with hafnium or titanium can be given.

The following compounds can be suitably used as the co-catalyst, which is a compound forming an ionic complex by reacting with the transition metal compound of the group 4 of the periodic table: tetra(pentafluorophenyl)borate anion-containing compounds such as triphenylcarbenium tetrakis(pentafluorophenyl)borate, N,N-dimethylanilinium tetrakis(pentafluorophenyl)borate, and lithium tetrakis(pentafluorophenyl)borate, and tetra(pentafluorophenyl)aluminate anion-containing compounds such as triphenylcarbenium tetrakis(pentafluorophenyl)aluminate, N,N-dimethylanilinium tetrakis(pentafluorophenyl)aluminate, and lithium tetrakis(pentafluorophenyl)aluminate.

As the organoaluminum compound, compounds having at least one Al—C bond in the molecule can be given. As specific examples of such organoaluminum compounds, trialkylaluminums such as triethylaluminum, triisobutylaluminum, and trihexylaluminum, dialkylaluminum halides such as diethylaluminum halide and diisobutylaluminum halide, a mixture of trialkylaluminum and dialkylaluminum halide, and alkylalmoxanes such as tetraethyldialmoxane and tetrabutylalmoxane can be given. Of these organoaluminum compounds, trialkylaluminum, a mixture of trialkylaluminum and dialkylaluminum halide, and alkylalmoxane are preferable, with particularly preferable organoaluminum compounds being triethylaluminum, triisobutylaluminum, a mixture of triethylaluminum and diethylaluminum chloride, and tetraethyldialmoxane. As organoaluminum, triethylaluminum, triisobutylaluminum, and the like are preferably used. These metallocene catalysts and/or co-catalysts may be used carried on a carrier. As the carrier, organic compounds such as polystyrene and inorganic oxides such as silica and alumina can be given.

As the polymerization method, any of a mass polymerization method, solution polymerization method, vapor phase polymerization method, suspension polymerization method, and the like can be given, and either a batch system or continuous system can be used.

Preliminary polymerization using a small amount of α-olefins such as ethylene, propylene, 1-butene, and 4-methyl-1-pentene may be carried out. The reaction is carried out usually at a temperature of −50 to 250° C., and preferably 0 to 150° C., usually for 1 to 10 hours under a pressure usually from atmospheric pressure to 300 kg/cm$^2$-G.

The granulation method of the invention can be in particular preferably applied to the flexible polyolefin resin having the following properties:

(1) the melting point of the flexible polyolefin resin (Tm-D) is 20 to 120° C.

(2) the crystallization time of the flexible polyolefin resin is 3 minutes or more, and (3) PP isotacticity [mm] is 50 to 90 mol %.

When the melting point (Tm-D) is less than 20° C., the flexible polyolefin resin is possibly handled with difficulty at room temperature; whereas when the melting point (Tm-D) is more than 120° C., there may be the case in which the advantageous effect of the invention is not efficiently exhibited. The melting point (Tm-D) is preferably 50 to 100° C., and more preferably 60 to 90° C.

The crystallization time is preferably three minutes or more. If the crystallization time is less than three minutes, the effect of promoting crystallization is small.

Because of the remarkable effect on promoting crystallization, the crystallization time is preferably five minutes or more, and more preferably ten minutes or more.

The crystallization time is measured with a differential scanning calorimeter as follows: A sample is maintained in a molten state at 190° C. for three minutes in a nitrogen atmosphere, rapidly quenched to 25° C. at a rate of about 300° C./min. by introducing liquid nitrogen, and maintained at this temperature. The crystallization time refers to the period of time from when the sample is cooled to 25° C. until the crystallization exothermic peak is observed.

Even if cooled to a temperature below the melting point, such a flexible polyolefin resin is only brought into a supercooled state, but does not lose fluidity (even if cooled below the crystallization temperature, the resin does not easily crystallize). For this reason, the resin maintains flowability in a cooling device at a temperature below the melting point and crystallizes for the first time when extruded from the cooling device, whereby it is easily cut.

The melting point (Tm-D) and crystallization time of the flexible polyolefin resin can be controlled by adjusting the isotacticity mentioned later.

The flexible polyolefin resin is preferably polypropylene with a PP isotacticity [mm] of 50 to 90 mol %. If less than 50 mol %, the resin may exhibit tackiness; if more than 90 mol %, processability may decrease. The PP isotacticity [mm] is preferably 50 to 80 mol %, and more preferably 60 to 80 mol %.

The PP isotacticity [mm] in the invention refers to a value determined by a method proposed by A. Zambelli et al. in Macromolecules, 6925 (1973).

Also, the flexible polyolefin resin is preferably a 1-butene polymer having a PB isotacticity of ((mmmm)/(mmrr+rmmr)) of 20 or less. If the PB isotacticity exceeds 20, flexibility is reduced and the processability is impaired.

Like the above-mentioned polypropylene, the 1-butene polymer preferably has the following properties of (1) and (2):

(1) the melting point of the 1-butene polymer (Tm-D) is 20 to 120° C., and (2) the crystallization time of the 1-butene polymer is 3 minutes or more.

The 1-butene polymer preferably further has the following property of (4):

(4) PB isotacticity ((mmmm)/(mmrr+rmmr)) is 20 or less.

In the invention, the PB isotacticity of ((mmmm)/(mmrr+rmmr)) is calculated from the mesopentad fraction (mmmm) and abnormal insertion content (1, 4 insertion fraction). The mesopentad fraction (mmmm) and abnormal insertion content (1, 4 insertion fraction) are measured according to the methods reported by Asakura et al. (Polymer Journal, 16, 717 (1984)), J. Randall et al. (Macromol. Chem. Phys., C29, 201 (1989)), and V. Busico et al. (Macromol. Chem. Phys., 198, 1257 (1997)). Specifically, the method includes measuring the signals of the methylene group and methine group using $^{13}$C-NMR spectrum, determining the mesopentad fraction and abnormal insertion content in a poly(1-butene) molecule, and calculating the PB isotacticity of ((mmmm)/(mmrr+rmmr)).

The PP isotacticity [mm] and PB isotacticity ((mmmm)/(mmrr+rmmr)) can be controlled by adjusting the type of catalyst, polymerization temperature, and monomer concentration.

The granules of the flexible polyolefin resin preferably remain left at a specific temperature for a specific time after granulation. This residence treatment can suppress the refusion of the granules which occurs after granulation.

As the facility for retaining the granules, a common vessel, tubing and the like can be used. When a vessel is used, the vessel desirably has a large surface area to prevent the refusion of the granules floating on the surface of the vessel. For enhancing cooling effect, stirring in the vessel is desired. For preventing the refusion of the granules, it is also effective that many tiered vessels be connected in series to prevent short pass. When tubing is used, the tubing desirably has an enough length to give a certain residence time. In the case where the tubing has too long a length to get in the way of the layout of the facility, the tubing may be wound like a coil or bundle together. The vessel and tubing are preferably provided with a temperature adjusting system such that the both are set at the optimum temperature which promotes the crystallization. As the facility for retaining the granules, a water vessel is preferable from the view point of cost and the like.

As the medium for retaining the granules, gas such as air and nitrogen also can be used in addition to water which is easy for industrial use. When water is used as the medium for retaining the granules, an antifusion agent may be added therein.

It is desired that the residence time is 5 minutes or more and 24 hours or less to promote sufficient crystallization. When the residence time is less than 5 minutes, the crystallization may be insufficient. The resin is sufficientially crystallized in 24 hours and, therefore, the residence time exceeding 24 hours leads to waste of the facility and increasing of cost.

The temperature of the residence treatment, which is the temperature of water when a water vessel is used for the facility for example, is 0° C. or more and 50° C. or less to promote the crystallization. When the temperature of the residence treatment is less than 0° C., water undesirably turns to ice. When the temperature of the residence treatment is more than 50° C., the crystallization rate is undesirably slow.

EXAMPLES

The invention is described below specifically by way of examples. However, the invention is not limited to the following examples.

The properties of the resins polymerized in the preparation examples were measured according to the following methods.

(1) Molecular Weight (Mw) and Molecular Weight Distribution (Mw/Mn)

The mass average molecular weight (Mw) and number average molecular weight (Mn) were measured using the following instrument under the following conditions, from which Mw/Mn was calculated.

GPC measurement apparatus
Column: TOSO GMHHR-H(S)HT
Detector: RI detector for liquid chromatogram WATERS 150 C
Measuring conditions
Solvent: 1,2,4-trichlorobenzene
Measurement temperature: 145° C.
Flow rate: 1.0 ml/min.
Concentration of sample: 2.2 mg/ml
Injection amount: 160 µl
Calibration curve: Universal Calibration
Analysis program: HT-GPC (Ver. 1.0)

(2) PP Isotacticity [mm] and PB Isotacticity ((mmmm)/(mmrr+rmmr))

Measured by the above-described method. $^{13}$C-NMR spectrum was measured using the following instrument under the following conditions.

Instrument: JNM-EX400 $^{13}$C-NMR analyzer manufactured by JEOL Ltd.
Method: Proton complete decoupling method
Concentration: 230 mg/ml
Solvent: 90:10 (volume ratio) mixed solvent of 1,2,4-trichlorobenzene and benzene-d6
Temperature: 130° C.
Pulse width: 45°
Pulse repeat time: 4 seconds
Integration: 10,000 times (3) Glass Transition Temperature (Tg), Melting Point (Tm-D), and Crystallization Time Measured by the above-described method using a differential scanning calorimeter (DSC: "DSC-7" manufactured by PerkinElmer, Inc.)

Preparation Example

Synthesis of Metallocene Catalyst [(1,2'-dimethylsilylene)(2,1'-dimethylsilylene)-bis(3-trimethylsilylmethylindenyl)zirconium dichloride]

Using a Schlenk bottle, 3.0 g (6.97 mmol) of lithium salt of (1,2'-dimethylsilylene)(2,1'-dimethylsilylene)-bis(indene) was dissolved in 50 ml of THF and the solution was cooled to −78° C. After slowly adding dropwise 2.1 ml (14.2 mmol) of iodomethyltrimethylsilane, the mixture was stirred at room temperature for 12 hours. The solvent was evaporated, 50 ml of ether was added, and the mixture was washed with a saturated ammonium chloride solution. After phase separation, the organic layer was dried and the solvent was removed to obtain 3.04 g (5.88 mmol) of (1,2'-dimethylsilylene)(2,1'-dimethylsilylene)-bis(3-trimethylsilylmethylindene). The yield was 84%.

Next, a Schlenk bottle was charged with the resulting 3.04 g (5.88 mmol) of (1,2'-dimethylsilylene)(2,1'-dimethylsilylene)-bis(3-trimethylsilylmethylindene) and 50 ml of ether in a nitrogen gas stream. After cooling to −78° C., 7.6 ml (11.7 mmol) of 1.54 M n-butyllithium solution in hexane was added and the mixture was stirred for 12 hours at room temperature. The solvent was evaporated and the resulting solid was washed with 40 ml of hexane to obtain 3.06 g (5.07 mmol) of a lithium salt as an ether addition compound. The yield was 73%.

The result of $^1$H-NMR (90 MHz, THF-d$_8$) measurement was as follows: δ 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2-7.7 (m, 8H, Ar—H)

The lithium salt obtained above was dissolved in 50 ml of toluene in a nitrogen stream. After cooling the solution to −78° C., a suspension of 1.2 g (5.1 mmol) of zirconium tetrachloride in toluene (20 ml) which was previously cooled to −78° C. was added dropwise. After the addition, the mixture was stirred at room temperature for six hours. The solvent was evaporated from the reaction solution. The resulting residue was recrystallized using dichloromethane to obtain 0.9 g (1.33 mmol) of (1,2'-dimethylsilylene)(2,1'-dimethylsilylene)-bis(3-trimethylsilylmethylindenyl)zirconium dichloride. The yield was 26%.

The result of $^1$H-NMR (90 MHz, CDCl$_3$) measurement was as follows: δ 0.0 (s, 18H, trimethylsilyl), 1.02, 1.12 (s, 12H, dimethylsilylene), 2.51 (dd, 4H, methylene), 7.1-7.6 (m, 8H, Ar—H)

Example 1

(1) Polymerization of Propylene

A stainless steel reactor with an internal volume of 0.20 m$^3$ equipped with a stirrer was continuously charged with n-heptane at a rate of 30 l/hr, triisobutylaluminum (manufactured by Nippon Aluminum Alkyls, Ltd.) at 15 mmol/hr, methylaluminoxane (manufactured by Albemarle Corp.) at 15 mmol/hr, and (1,2'-dimethylsilylene)(2,1'-dimethylsilylene)-bis(3-trimethylsilylmethylindenyl)zirconium dichloride obtained in the Preparation Example at 15 µmol/hr. Polypropylene was obtained by polymerizing while continuously supplying propylene and hydrogen under the conditions of a polymerization temperature of 60° C., a gas phase hydrogen concentration of 50 mol %, and a total pressure in the reactor of 0.7 MPaG.

(2) Granulation of Polypropylene

After the addition of Irganox 1010 to the resulting polymer solution to a concentration of 500 wtppm, the solvent was removed by using a stainless steel volatilizer with an internal volume of 3 m$^3$ at an internal temperature of 150° C.

Then, the molten resin was transported using a transporting pump to a polymer mixer equipped with a jacket (L84-VPR-3.7 manufactured by SATAKE CO., LTD.) The resin was cooled to 65° C. in the polymer mixer, followed by underwater granulation with a granulator. In this instance, PASC-21HS manufactured by TANABE PLASTICS MACHINERY CO., LTD. was used as the granulator, the temperature of cooling water was 10° C., and the circumferential velocity of cutter was 3.8 m/s. Silicone (X-22-904 manufactured by Shin-Etsu Chemical Co., Ltd.) was added to the cooling water to a concentration of 600 wtppm.

As a result of the underwater granulation, the propylene pellets obtained did not adhere among themselves and did not form lumps in the granulation process.

The resulting metallocene polypropylene was evaluated to confirm that the molecular weight distribution (Mw/Mn) was 1.8, the molecular weight (Mw) was 33,000, the PP isotacticity [mm] was 67 mol %, the glass transition temperature (Tg) was −4° C., and the melting point (Tm-D) was 70° C. The crystallization time was 6 minutes.

Comparative Example 1

Polypropylene was granulated in the same manner as in Example 1 except that the resin was not cooled in the polymer mixer and the temperature of the polypropylene was 150° C. at the outlet of the polymer mixer.

As a result, the propylene pellets obtained adhered among themselves and formed lumps in the granulation process.

Comparative Example 2

Polypropylene was granulated in the same manner as in Example 1 except that silicone was not added.

As a result, the propylene pellets obtained adhered among themselves and formed lumps in the granulation process.

Comparative Example 3

Polypropylene was granulated in the same manner as in Example 1 except that the temperature of the cooling water was 40° C.

As a result, the propylene pellets obtained adhered among themselves and formed lumps in the granulation process.

Example 2

(1) Polymerization of Butene-1

A stainless steel reactor with an internal volume of 0.20 m$^3$ equipped with a stirrer was continuously charged with n-heptane at a rate of 20 l/hr, triisobutylaluminum (manufactured by Nippon Aluminum Alkyls, Ltd.) at 16 mmol/hr, methylaluminoxane (manufactured by Albemarle Corp.) at 17 mmol/hr, and (1,2'-dimethylsilylene)(2,1'-dimethylsilylene)-bis(3-trimethylsilylmethylindenyl)zirconium chloride obtained in the Preparation Example at 17 µmol/hr. Polybutene-1 was obtained by polymerizing while continuously supplying 1-butene and hydrogen under the conditions of a polymerization temperature of 60° C., a gas phase hydrogen concentration of 50 mol %, and a total pressure in the reactor of 0.7 MPaG.

(2) Granulation of Polybutene-1

After the addition of Irganox 1010 to the resulting polymer solution to a concentration of 500 wtppm, the solvent was removed by using a stainless steel volatilizer with an internal volume of 3 m$^3$ at an internal temperature of 150° C. Hereinafter, polybutene-1 was granulated in the same manner as in Example 1.

As a result of the underwater granulation, the polybutene-1 pellets obtained did not adhere among themselves and did not form lumps in the granulation process.

The resulting metallocene polybutene-1 was evaluated to confirm that the molecular weight distribution (Mw/Mn) was 1.8, the molecular weight (Mw) was 70,000, the PB isotacticity ((mmmm)/(mmrr+rmmr)) was 8.2, the glass transition temperature (Tg) was −29° C., and the melting point (Tm-D) was 71° C. The crystallization time was 30 minutes or more.

Example 3

The pellets obtained in Example 1 were collected in a water vessel where the temperature of water was 13° C., followed by residence for 40 minutes. Then the pellets were removed and the following evaluation experiment for refusion was conducted.

The removed pellets were put in a cell with a cross-sectional area of 60 mm×60 mm and a height of 70 mm. A lid with a weight of 330 g was put on the upper surface of the cell, and then a weight with 5,000 g was put on the lid, followed by allowing to stand for 90 minutes 50° C.

After 90 minutes, the lid and the weight were put off, and the refusion condition of the pellets was observed with naked eyes. As a result, the refusion of the pellets could not be observed.

Comparative Example 4

The evaluation experiment for refusion was conducted in the same manner as in Example 3 except that the residence time was 3 minutes. As a result, the refusion of the pellets was observed.

Comparative Example 5

The evaluation experiment for refusion was conducted in the same manner as in Example 3 except that the temperature of water was 80° C. As a result, the refusion of the pellets was observed.

Example 4

The pellets obtained in Example 2 were collected in a water vessel where the temperature of water was 13° C., followed by residence for 40 minutes. Then the pellets were removed and the following evaluation experiment for refusion was conducted.

The removed pellets were put in a cell with a cross-sectional area of 60 mm×60 mm and a height of 70 mm. A lid with a weight of 330 g was put on the upper surface of the cell, and then a weight with 5,000 g was put on the lid, followed by allowing to stand for 90 minutes 50° C.

After 90 minutes, the lid and the weight were put off, and the refusion condition of the pellets was observed with naked eyes. As a result, the refusion of the pellets could not be observed.

INDUSTRIAL APPLICABILITY

The invention can provide a method for granulating a flexible polyolefin resin with high productivity by utilizing heat of a volatilization process and using an underwater granulation method excelling in cooling efficiency.

The invention can provide an efficient method for granulating a flexible polyolefin resin without refusion.

The invention claimed is:

1. A method for granulating a flexible polyolefin resin comprising:

polymerizing an α-olefin having 3 to 20 carbon atoms with a metallocene catalyst to form a flexible polypropylene resin;

melting the resin by volatilization after polymerization;

cooling the resin to the melting point of the resin (Tm-D) ±50° C., wherein the melting point of the resin (Tm-D) is the peaktop of the peak observed on the highest temperature side of a fusion endothermic curve obtained by heating 10 mg of a sample at a rate of 10° C./min after being retained at 10° C. for 5 minutes in a nitrogen atmosphere measured with a differential scanning calorimeter; and granulating the cooled resin by an underwater granulation method wherein the underwater granulation method uses cooling water of 30° C. or less to which an antifusion agent is added, wherein the polypropylene has the following properties:

(1) a melting point (Tm-D) of 20 to 120° C., (2) a crystallization time of 3 minutes or more, and (3) a PP isotacticity [mm] of 50 to 90 mol%.

2. The method according to claim 1 wherein the flexible polyolefin resin is a 1-butene polymer having the following property:

(4) a PB isotacticity ((mmmm)/(mmrr+rmmr)) of 20 or less.

3. The method according to claim 1 further comprising:

subjecting the flexible polyolefin resin after granulation to a residence treatment at 50° C. or less for a time ranging from 5 minutes or more to 24 hours or less.

4. The method according to claim 3 wherein the residence treatment is performed by using a water pool.

5. The method according to claim 3, wherein the resin has a melting point of 50-100° C.

6. The method according to claim 1, wherein the resin is contacted with an antifusion agent only during the granulating.

7. The method according to claim 1, which is carried out by contacting the resin one time with an antifusion agent.

* * * * *